United States Patent
Morey et al.

(10) Patent No.: US 10,566,685 B2
(45) Date of Patent: Feb. 18, 2020

(54) INTEGRATED MOUNTING FOR VEHICLE IMMOBILIZER SYSTEM ANTENNA

(71) Applicant: CNH Industrial America LLC, New Holland, PA (US)

(72) Inventors: Daniel A. Morey, Mundelein, IL (US); Donald M. Krueger, Westchester, IL (US); Thomas L. Howard, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 204 days.

(21) Appl. No.: 15/705,857

(22) Filed: Sep. 15, 2017

(65) Prior Publication Data

US 2019/0089043 A1 Mar. 21, 2019

(51) Int. Cl.
| | |
|---|---|
| *H01Q 1/32* | (2006.01) |
| *B62D 33/06* | (2006.01) |
| *B62D 65/16* | (2006.01) |
| *H01Q 1/22* | (2006.01) |
| *B60R 25/24* | (2013.01) |
| *B60R 25/04* | (2013.01) |

(52) U.S. Cl.
CPC ........... *H01Q 1/3291* (2013.01); *B62D 33/06* (2013.01); *B62D 65/16* (2013.01); *H01Q 1/2216* (2013.01); *H01Q 1/3233* (2013.01); *B60R 25/04* (2013.01); *B60R 25/245* (2013.01); *B60R 2325/105* (2013.01); *B60R 2325/308* (2013.01)

(58) Field of Classification Search
CPC ...... H01Q 1/32; H01Q 1/3233; H01Q 1/3283; H01Q 1/3291; H01Q 1/325; H01Q 1/3275; H01Q 1/2216
See application file for complete search history.

(56) References Cited

U.S. PATENT DOCUMENTS

| | | |
|---|---|---|
| 4,337,841 A | 7/1982 | Law |
| 6,204,820 B1 | 3/2001 | Jensen, Jr. |
| 6,351,242 B1 | 2/2002 | Hesker |
| 6,404,071 B1* | 6/2002 | Kurano ................. B60R 25/04 114/55.58 |
| 6,614,402 B1 | 9/2003 | Wendt et al. |
| 9,311,616 B2 | 4/2016 | Westerlage et al. |
| 2002/0126055 A1* | 9/2002 | Lindenmeier ............ H01Q 1/32 343/713 |
| 2003/0022616 A1 | 1/2003 | Stiehl |
| 2003/0063037 A1 | 4/2003 | March et al. |
| 2003/0142025 A1 | 7/2003 | Lucas et al. |
| 2003/0156069 A1* | 8/2003 | Ooe ..................... H01Q 1/3275 343/713 |
| 2003/0216149 A1 | 11/2003 | Edwards et al. |
| 2005/0030234 A1 | 2/2005 | Lauhoff |
| 2006/0047418 A1 | 3/2006 | Metzler et al. |

(Continued)

FOREIGN PATENT DOCUMENTS

WO  2005/060046 A2  6/2005

*Primary Examiner* — Hoang V Nguyen

(74) *Attorney, Agent, or Firm* — Rickard K. DeMille; Rebecca L. Henkel

(57) ABSTRACT

A work vehicle including an operator cab, an immobilizer system including an immobilizer antenna module, and an immobilizer antenna mounting having a surface. The immobilizer antenna mounting includes at least one locating feature configured for orienting the immobilizer antenna module.

17 Claims, 3 Drawing Sheets

(56) References Cited

U.S. PATENT DOCUMENTS

| | | |
|---|---|---|
| 2006/0055603 A1 | 3/2006 | Jesson et al. |
| 2006/0061145 A1 | 3/2006 | Strebe et al. |
| 2006/0099354 A1 | 5/2006 | Aichholzer et al. |
| 2006/0211358 A1 | 9/2006 | Hachmann |
| 2006/0290468 A1 | 12/2006 | Hidaka et al. |
| 2010/0289662 A1* | 11/2010 | Dasilva .................. F16P 3/147 340/686.6 |
| 2012/0068040 A1 | 3/2012 | Venghaus |
| 2013/0140847 A1 | 6/2013 | Altes et al. |
| 2014/0210677 A1 | 7/2014 | Fahlbusch et al. |

* cited by examiner

US 10,566,685 B2

INTEGRATED MOUNTING FOR VEHICLE IMMOBILIZER SYSTEM ANTENNA

FIELD OF THE INVENTION

The present invention pertains to a work vehicle and, more specifically, to a work vehicle which includes an immobilizer system.

BACKGROUND OF THE INVENTION

Work vehicles in the form of off-road machines can take many forms, such as agricultural tractors, combines, graders, construction backhoes, etc. In certain circumstances, it may be desirable to limit access to these work vehicles. For example, it may be desirable to restrict access to a particular work vehicle such that only certain operators who have been trained to use the work vehicle may operate the work vehicle.

It is known to incorporate "immobilizers" into a vehicle in order to control access to the vehicle. A typical immobilizer system includes a transponder incorporated in a mechanical key, e.g. a key fob, and an onboard verification unit. The onboard verification unit may immobilize or inhibit the starting of the engine of the vehicle unless a prescribed response is returned from the key fob, Many immobilizer systems have incorporated radio frequency identification (UM) technology to automatically communicate identifying information from an RFD tag in a key fob to an RFID tag reader. In this regard, the engine will only start for the prescribed RFID tag of an authorized operator. The onboard verification unit may include an immobilizer antenna module and various hardware to read the RFID tag in the key fob.

Given various design constrains and the directional nature of the immobilizer antenna, the possible places to mount the immobilizer antenna may be limited. For instance, issues pertaining to the interference of radio signals between the immobilizer antenna and the RFID tag in the key fob may arise if the immobilizer antenna is positioned too close to a metal component or is oriented incorrectly. To ensure the orientation of the immobilizer antenna and minimize the possibility of interference, a separate mounting bracket may need to be incorporated which increases manufacturing complexity and production costs.

What is needed in the art is a cost-effective mounting for an immobilizer antenna module on a work vehicle.

SUMMARY OF THE INVENTION

The present invention provides a mounting that has integrated protrusions that are configured to orient an immobilizer antenna module. The mounting may be in the form of an air duct or a cosmetic panel.

The invention in one form is directed to a work vehicle including an operator cab, an immobilizer system including an immobilizer antenna module, and an immobilizer antenna mounting having a surface. The immobilizer antenna mounting includes at least one locating feature configured for orienting the immobilizer antenna module.

The invention in another form is directed to a mounting for an immobilizer antenna module of a vehicle immobilizer system. The mounting includes at least one locating feature monolithically formed with the immobilizer antenna mounting and configured for orienting the immobilizer antenna module.

The invention in yet another form is directed to a method for mounting an immobilizer antenna module. The method includes the steps of providing a work vehicle that includes an operator cab, an immobilizer system that has an immobilizer antenna module and an immobilizer antenna mounting that has a surface. The immobilizer antenna mounting includes at least one locating feature configured for orienting the immobilizer antenna module. The method includes the further step of orienting the immobilizer antenna module by positioning the immobilizer antenna module relative to the at least one locating feature.

An advantage of the present invention is that an immobilizer antenna module may be cost-effectively and efficiently mounted onto the exterior of a work vehicle.

Another advantage of the present invention is that the immobilizer antenna mounting reduces production costs because the immobilizer antenna mounting is an integrated component that does not require separate mounting brackets, spacers, and/or other components in order to mount the immobilizer antenna module.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
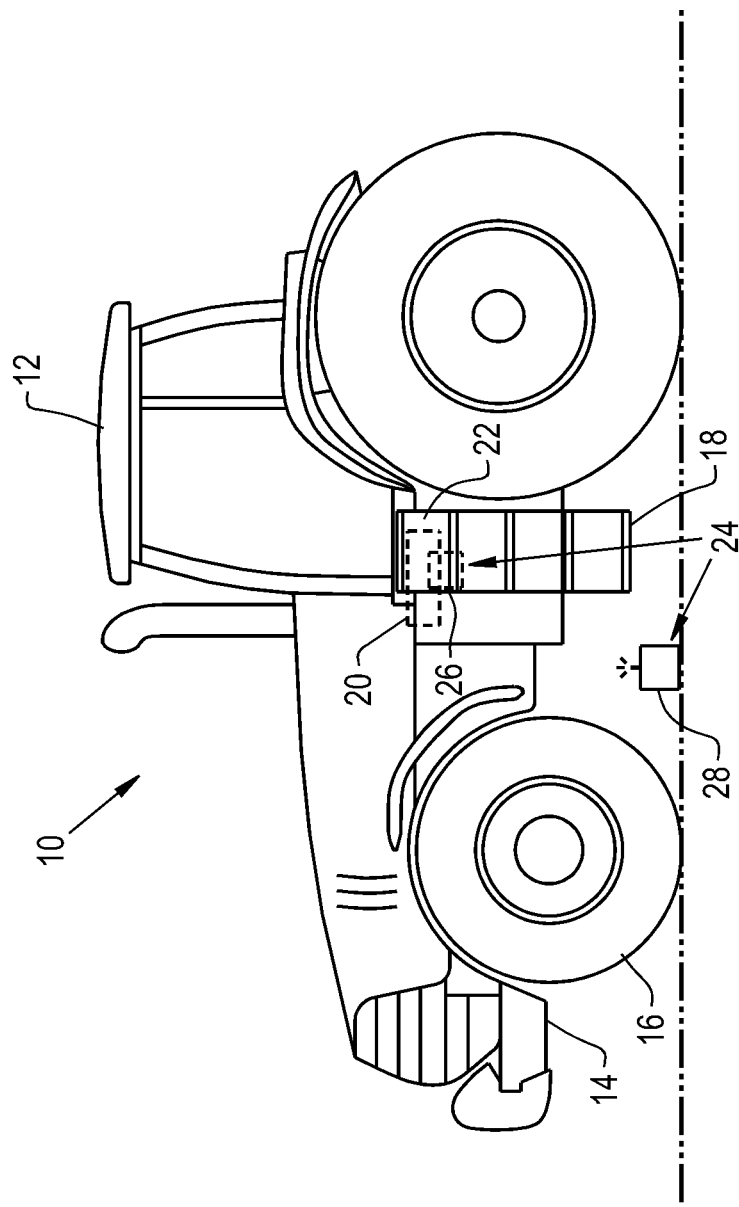
FIG. 1 illustrates a side view of an exemplary embodiment of a work vehicle, in accordance with an exemplary embodiment of the present invention.

Referring now to the drawings, and more particularly to FIG. 1, there is shown a work vehicle 10 in the form of an agricultural tractor which generally includes an operator cab 12, a chassis 14, wheels 16, and a set of stairs 18 leading up the cab 12. The work vehicle 10 may also include an air flow assembly 20 for providing air to the cab 12, cosmetic paneling 22, and an immobilizer system 24. The work vehicle may be in the form of any known work vehicle such as a tractor, a combine, a windrower, etc.

The cab air flow assembly 20 may be in the form of a climate control assembly that includes various components for controlling the climate, i.e., air temperature, of the cab 12, filtering the air, and channeling the air into and out of the cab 12. For example, the cab air flow assembly 20 may include various air ducts in order to intake "dirty" (prefiltered) air, channel the dirty air through an air filter, and subsequently channel the clean (filtered) air into the cab 12. For brevity of description, these components are hidden from view. The various ducts and components of the cab air flow assembly 20 may be positioned underneath the cab 12. For example, the ducts of the cab air flow assembly 20 may be mounted to a support frame member underneath the cab 12 or the ducts may be mounted to the underside of the cab 12 itself.

The cosmetic paneling 22 may be configured to cover and otherwise shield the space immediately beneath the cab 12. The paneling 22, which may be located beneath the cab 12, may substantially stretch the length of the sides of the cab 12 and/or wrap around a portion of the front and/or rear of the cab 12. On the entry-door side of the work vehicle 10, the paneling 22 may be located behind the stairs 18. The paneling 22 may be affixed to the bottom portion of the cab 12 or to a support frame member under the cab 12 by any known means, including fasteners such as bolts and nuts. The paneling 22 may be of any desired shape, such as predominantly rectangular, that desirably covers the space beneath the cab 12. The paneling 22 may also have bent and/or straight sections, and further the paneling 22 may have a cross-section that is has curved and/or straight portions. The paneling 22 may be composed of any suitable plastic or composite material.

The immobilizer system 24 may include an immobilizer antenna module 26 and a key fob 28. The immobilizer system 24 may include various other components, hardware, and/or software in order to immobilize the work vehicle 10 unless it receives a prescribed communication signal from a key fob 28 of an authorized operator. The immobilizer antenna module 26 may be externally mounted beneath the cab 12 of the work vehicle 10. For example, the immobilizer antenna module 26 may be mounted to an integrated component, as discussed below, that is located beneath the cab 12 and proximate to the stairs 18. The immobilizer antenna module 26 may be in the form of a known antenna module. The key fob 28 may be in the form of a known key fob that incorporates a transponder with a mechanical key. The immobilizer antenna module 26 and the key fob 28 may wirelessly communicate with one another. For example, the key fob 28 may include an RFID tag and the immobilizer antenna module 26 may be in the form of an RFID tag reader.

Figure 2:
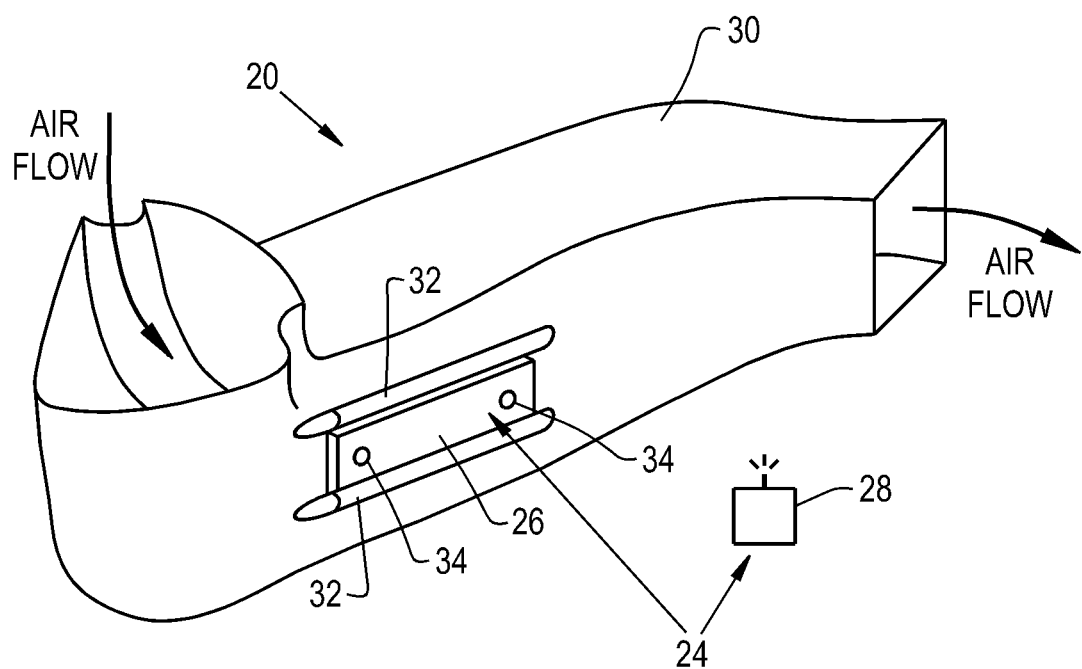
FIG. 2 illustrates a perspective view of an exemplary embodiment of an immobilizer antenna mounting, in accordance with an exemplary embodiment of the present invention.

Referring now collectively to FIGS. 1-2, there is shown an immobilizer antenna mounting 30 that is configured to mount the immobilizer antenna module 26. The immobilizer antenna mounting 30 may include at least one locating feature 32 in the form of a protrusion 32 that protrudes above its surface. The locating feature 32 may also be in the form of an indentation or a combination of an indentation and protrusion. As shown, the immobilizer antenna mounting 30 is in the form of an air duct 30 that may be incorporated as part of the cab air flow assembly 20. For example, the air duct 30 may be in the form of an air intake duct that channels dirty air into a filter (not shown). Accordingly, the air duct 30 may be configured to channel air flow as well as mount the immobilizer antenna module 26. The air duct 30 may be located beneath the cab 12, for example, on an underside of the cab 12 that is proximate to the stairs 18. The air duct 30 may be oriented in any desired position such that the immobilizer antenna module 26 may obtain good reception with the key fob 28. For instance, the immobilizer antenna module 26 may be oriented such that its antenna points substantially towards the stairs 18 of the work vehicle 10. The air duct 30 may be composed of a radio translucent material (e.g., a plastic or composite material) which does not interfere with the communication of the immobilizer antenna module 26 and the key fob 28. The air duct 30 may be configured with any desired shape, e.g. circular or rectangular, and the air duct 30 may have a curved surface and/or a portion of its surface which is substantially planar.

The protrusion(s) 32 of the air duct 30 may be configured for orienting the immobilizer antenna module 26 such that the immobilizer antenna module 26 directly contacts both the surface of the air duct 30 and at least a portion of the protrusion(s) 32. Hence, the protrusion(s) 32 may be configured to fixedly position the angle of the immobilizer antenna module 26 relative to the body of the air duct 30. The protrusion(s) 32 may extend along the full length of the immobilizer antenna module 26 or along a portion thereof. Also, the protrusion(s) 32 may extend substantially horizontally, and thereby the immobilizer antenna module 26 may be approximately parallel with the horizontal plane of the air duct 30. The protrusion(s) 32 may be in the form of elongated protrusion(s) that extend in the lengthwise direction of air duct 30. For example, the protrusion(s) 32 may be in the form of cylindrical raised rib(s). However, the protrusion(s) 32 may be of any desired shape, such as rectangular instead of cylindrical. The protrusion 32 is shown as a uniform elongated protrusion; however, the protrusion 32 may be segmented or the protrusion 32 may be in the form of a series of raised points or dots. The protrusion(s) 32 may be integrated into the air duct 30 such that the air duct 30 is a single monolithic, i.e., uniform member. In the present embodiment, there are two protrusions 32 that extend parallel with one another such that each protrusion 32 respectively contacts the top and bottom edges of the immobilizer antenna module 26. It is conceivable to include only one or more than two protrusions 32, such as four protrusions 32 that contact each side of the immobilizer antenna module 26, in order to orient the immobilizer antenna module 26.

The immobilizer antenna module 26 may be mounted to the air duct 30 by adhesives and/or fasteners such that the back of the immobilizer antenna module 26 abuts against the surface of the air duct 30. For example, immobilizer antenna module 26 may include one or more mounting holes 34, and the air duct 30 may include one or more corresponding threaded inserts to receive fasteners therein. Alternatively, if the air duct 30 does not include a threaded insert, then one or more self-tapping screws may be used to secure the immobilizer antenna module 26 to the air duct 30. As the air duct 30 may be included at the intake side (i.e., before a filter), any small leaks as a result of the self-tapping screws would not cause an issue that inhibits the function of the cab air flow assembly 20. Further, in order to mount the immobilizer antenna module 26, it is conceivable to include corresponding grooves and lip portions on the protrusions 32 so that the immobilizer antenna module 26 may be slid into the grooves and secured by the lip portions of the protrusions 32 (not shown).

Figure 3:
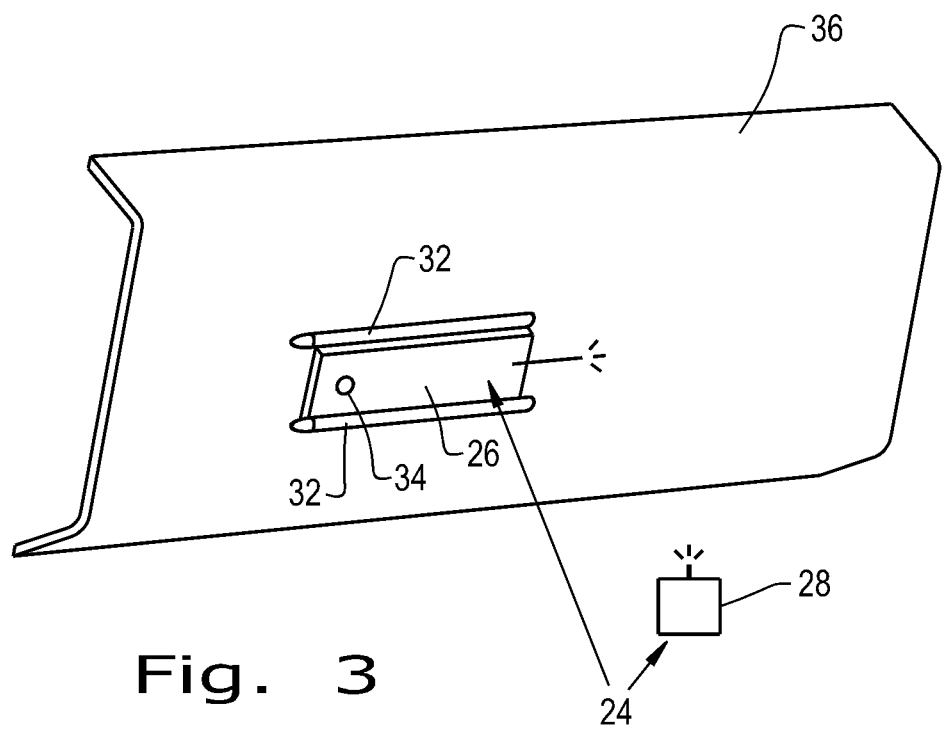
FIG. 3 illustrates a perspective view of another exemplary embodiment of an immobilizer antenna mounting, in accordance with an exemplary embodiment of the present invention.

Referring now to FIG. 3, there is shown an alternative embodiment of an immobilizer antenna mounting 36 in the form of a cosmetic panel 36. The cosmetic panel 36 may be substantially the same as the cosmetic panel 22 as shown in FIG. 1, except that the cosmetic panel 36 is configured to mount the immobilizer antenna module 26. In this regard, the immobilizer antenna mounting 36 is dual purposed for covering a space underneath the cab 12 and mounting the immobilizer antenna module 26. The immobilizer antenna mounting 36 may also include one or more protrusions 32, as discussed above, which are integrated into the immobilizer antenna mounting 36. For example, the immobilizer antenna mounting 36 may include two protrusions 32 to contact the top and bottom edge of the immobilizer antenna module 26. As discussed above, one or more than two protrusions 32 may be used to mount the immobilizer antenna module 26. The immobilizer antenna mounting 36 may also be composed of a plastic material. The immobilizer antenna module 26 may be mounted to the front (exterior facing) side or the back (interior facing) side of the immobilizer antenna mounting 36. As shown, the immobilizer antenna mounting 36 is a substantially straight member with a cross-section that is partially bent at both ends. However, the immobilizer antenna mounting 36 may have bent or straight sections and/or the immobilizer antenna mounting 36 may have a substantially straight and/or curved cross-section. As discussed above, the immobilizer antenna module 26 may include one or more mounting holes 34, and the immobilizer antenna module 26 may be affixed to the immobilizer antenna mounting 36 by an adhesive, self-tapping screws, and/or by corresponding threaded inserts in the immobilizer antenna mounting 36.

As the immobilizer antenna mountings 30, 36 may be plastic and respectively include integrated protrusions 32, either of the immobilizer antenna mountings 30, 36 may be injection molded, blow molded, rotational molded, or molded by any other suitable process. Further, as both of the immobilizer antenna mountings 30, 36 may be plastic, neither immobilizer antenna mounting 30, 36 interferes with the communication of the immobilizer antenna module 26 and the key fob 28. For example, in the case of RFID, the radio waves of the immobilizer system 24 may be transmitted through the mountings 30, 36 without causing degradation of the signal. In this regard, as an operator approaches the top of the stairs 18, the immobilizer antenna module 26 may properly identify the signal of the operator's key fob 28 due to the lack of communication interference as a result of the material composition of the mountings 30, 36, placement of mountings 30, 36 relative to the cab 12 and stairs 18, and orientation of the protrusions 32.

Figure 4:
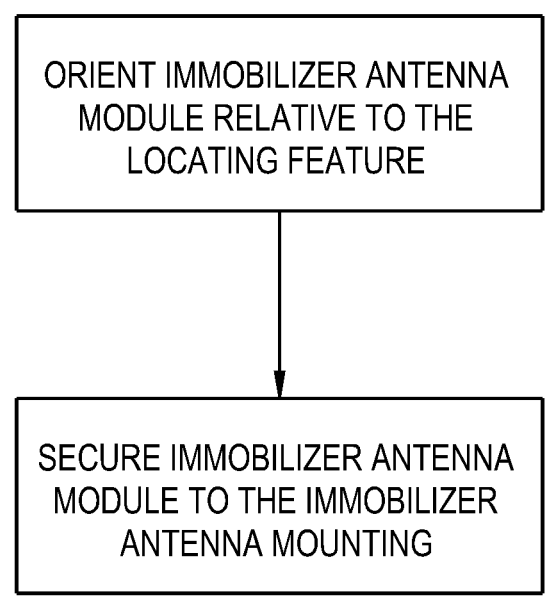
FIG. 4 illustrates a flow chart of a method for mounting an immobilizer antenna module in accordance with an exemplary embodiment of the present invention.

Referring now to FIG. 4, there is shown a method of mounting the immobilizer antenna module 26 to either one of the immobilizer antenna mountings 30, 36. It should be appreciated that the immobilizer antenna module 26 may be mounted to either immobilizer antenna mounting 30, 36 before or after the immobilizer antenna mounting 30, 36 is mounted to the work vehicle 10. Initially, the immobilizer antenna module 26 may be oriented relative to the protrusion (s) 32. The protrusion(s) 32 may thereby dictate the orientation of and provide support for the immobilizer antenna module 26. Subsequently, the immobilizer antenna module 26 may be secured to the immobilizer antenna mounting 30, 36. In this regard, as discussed above, the immobilizer antenna module 26 may be adhered via adhesives and/or fastened to the immobilizer antenna mounting 30, 36. Thus, at least a portion (e.g. the backside) of the immobilizer antenna module 26 contacts at least a portion of the surface of the immobilizing antenna mounting 30, 36, and at least a portion (e.g. a side) of the immobilizer antenna mounting 30, 36 contacts at least a portion of the protrusion(s) 32.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:
1. A work vehicle, comprising:
an operator cab;
an immobilizer system including an immobilizer antenna module; and
an immobilizer antenna mounting having a surface, said immobilizer antenna mounting including at least one locating feature configured for orienting said immobilizer antenna module, wherein said at least one locating feature is in the form of an elongated protrusion protruding above the surface of the immobilizer antenna mounting.

2. The work vehicle according to claim 1, wherein said at least one locating feature is monolithically formed with said immobilizer antenna mounting.

3. The work vehicle according to claim 1, wherein said immobilizer antenna mounting is composed of a radio translucent material.

4. The work vehicle according to claim 3, wherein said immobilizer antenna mounting is composed of a plastic material or a composite material.

5. A work vehicle, comprising:
an operator cab;
an immobilizer system including an immobilizer antenna module; and
an immobilizer antenna mounting having a surface, said immobilizer antenna mounting including at least one locating feature configured for orienting said immobilizer antenna module, wherein said at least one locating feature includes two locating features.

6. The work vehicle according to claim 5, wherein said two locating features extend substantially parallel with one another such that said immobilizer antenna module is located between said two locating features.

7. A work vehicle, comprising:
an operator cab;
an immobilizer system including an immobilizer antenna module; and
an immobilizer antenna mounting having a surface, said immobilizer antenna mounting including at least one locating feature configured for orienting said immobilizer antenna module, wherein said immobilizer antenna mounting is in the form of an air duct positioned beneath the cab such that said immobilizer antenna mounting is configured to channel an air flow and mount said immobilizer antenna module.

8. The work vehicle according to claim 7, wherein said air duct is in the form of an air intake duct of a cab air flow assembly.

9. A work vehicle, comprising:
an operator cab;
an immobilizer system including an immobilizer antenna module; and
an immobilizer antenna mounting having a surface, said immobilizer antenna mounting including at least one locating feature configured for orienting said immobilizer antenna module, wherein said immobilizer antenna mounting is in the form of a cosmetic panel such that said cosmetic panel is configured to cover a space underneath the cab and mount said immobilizer antenna module.

10. A mounting for an immobilizer antenna module of a vehicle immobilizer system, said mounting including:

at least one locating feature monolithically formed with said immobilizer antenna mounting and configured for orienting said immobilizer antenna module wherein said at least one locating feature is in the form of an elongated protrusion protruding above a surface of the immobilizer antenna mounting.

11. The mounting according to claim 10, wherein said immobilizer antenna mounting is in the form of an air duct positioned beneath an operator cab of a vehicle such that said immobilizer antenna mounting is configured to channel an air flow and mount said immobilizer antenna module.

12. The mounting according to claim 10, wherein said immobilizer antenna mounting is in the form of a cosmetic panel such that said cosmetic panel is configured to cover a space underneath the cab and mount said immobilizer antenna module.

13. A method for mounting an immobilizer antenna module, comprising the steps of:
providing a work vehicle that includes an operator cab, an immobilizer system including said immobilizer antenna module and an immobilizer antenna mounting having a surface, said immobilizer antenna mounting including at least one locating feature configured for orienting said immobilizer antenna module, wherein said at least one locating feature is in the form of an elongated protrusion protruding above the surface of the immobilizer antenna mounting; and
orienting said immobilizer antenna module by positioning said immobilizer antenna module relative to said at least one locating feature.

14. The method according to claim 13, further including a step of securing said immobilizer antenna module to the immobilizer antenna mounting.

15. The method according to claim 14, wherein said step of securing said immobilizer antenna module includes at least one of adhering and fastening said immobilizer antenna module to the immobilizer antenna mounting such that at least a portion of the immobilizer antenna module contacts at least a portion of the surface of the immobilizing antenna mounting and at least a portion of said at least one locating feature.

16. The method according to claim 13, wherein said at least one locating feature is monolithically formed with said immobilizer antenna mounting.

17. The method according to claim 13, wherein said immobilizer antenna mounting is composed of a radio translucent material.

* * * * *